United States Patent [19]
Kaplan

[11] 3,807,361
[45] Apr. 30, 1974

[54] ANIMAL ELEVATING MEANS

[76] Inventor: Norman C. Kaplan, 6420 W. Maple, West Bloomfield, Mich. 48088

[22] Filed: July 24, 1972

[21] Appl. No.: 274,274

[52] U.S. Cl. .............................................. 119/102
[51] Int. Cl. ............................................ A61d 03/00
[58] Field of Search ........ 119/102, 100, 99, 98, 103

[56] References Cited
UNITED STATES PATENTS

| 669,847 | 3/1901 | McDermott | 119/102 |
|---|---|---|---|
| 2,995,111 | 8/1961 | Darden | 119/99 |
| 986,879 | 3/1911 | Wallis | 119/102 |
| 3,208,432 | 9/1965 | Fisk | 119/103 |
| 161,825 | 4/1875 | Relph | 119/102 |

Primary Examiner—Hugh R. Chamblee
Attorney, Agent, or Firm—Weiner, Basile and Weintraub

[57] ABSTRACT

A portable device for facilitating the administration of services to animals, such as the shoeing of equines, and the like, includes a collapsible open-walled frame structure or stall, means for elevating the animal, the means being laterally displaced from the frame structure, and means for supporting the animal when elevated. Means are included for inhibiting egress and ingress from the stall by the animal.

8 Claims, 6 Drawing Figures

ANIMAL ELEVATING MEANS

BACKGROUND OF THE INVENTION

1. Field of the Invention

The present invention pertains to animal husbandry. More particularly the present invention pertains to means for immobilizing an animal for performing or administering services thereto. In a particular adaptation the present invention pertains to means for facilitating the shoeing of horses and like animals.

2. Prior Art

Heretofore, there has been a dearth in the development of means for facilitating the administering of services to animals such as, shoeing, nail clipping, veterinary functions and the like. In the sense of facilitating the administration is meant means for immobilizing the animal through mechanical means. Yet there has been an attendant growth in the use and keeping of such animals for recreational and business purposes.

The prior art devices for accomplishing the herein defined purposes fail to make use of modern technological advances. Thus, they provide overhead pulleys, chains, ropes and the like for immobilizing any one leg of the animal. See inter alia, U.S. Pat. Nos. 1,318,202; 877,947; and 866,003.

Of critical importance hereto is the fact that these prior art devices fail to appreciate the fact that once the animal is lifted off the ground to any degree it is completely immobilized. Rather, these devices by providing for the elevation of a single leg, enables the animal to still kick or otherwise attempt to maim a person in proximity thereto. Further, the prior art devices are not portable, thereby failing to consider the modern day needs for mobility.

SUMMARY OF THE INVENTION

In accordance with the present invention, there is provided a portable device for immobilizing an animal, such as an equine, ruminant, canine or the like, which includes:
a. a portable open-walled frame structure, or stall,
b. means for supporting the animal when elevated, and
c. means for elevating the animal to immobilize the animal.

The walls of the frame structure is open to allow accessibility to the animal. Furthermore, the means for elevating the animal is laterally displaced from the frame structure, per se, so as to be non-interfering therewith, and can be adapted to independently elevate either the forward or rearward part of the animal. Means are also included to prevent egress by the animal from the stall once it is therewithin.

For a more complete understanding of the present invention reference is made to the following detailed description and accompanying drawing. In the drawing like reference characters refer to like parts throughout the several views.

DESCRIPTION OF THE PREFERRED EMBODIMENTS

Figure 1:
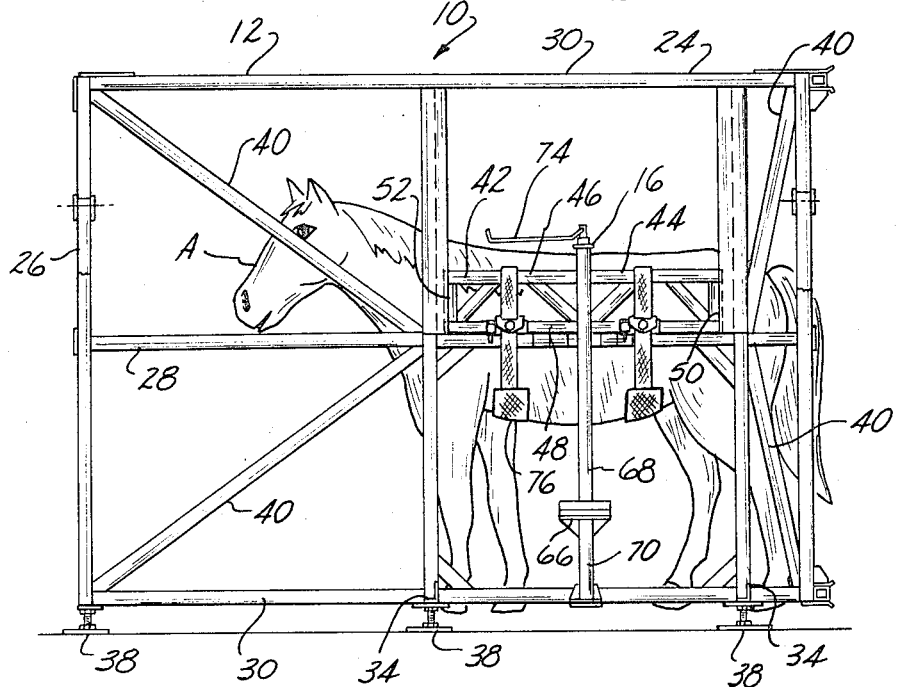
FIG. 1 is a side elevational view of the device of the present invention.
Figure 2:
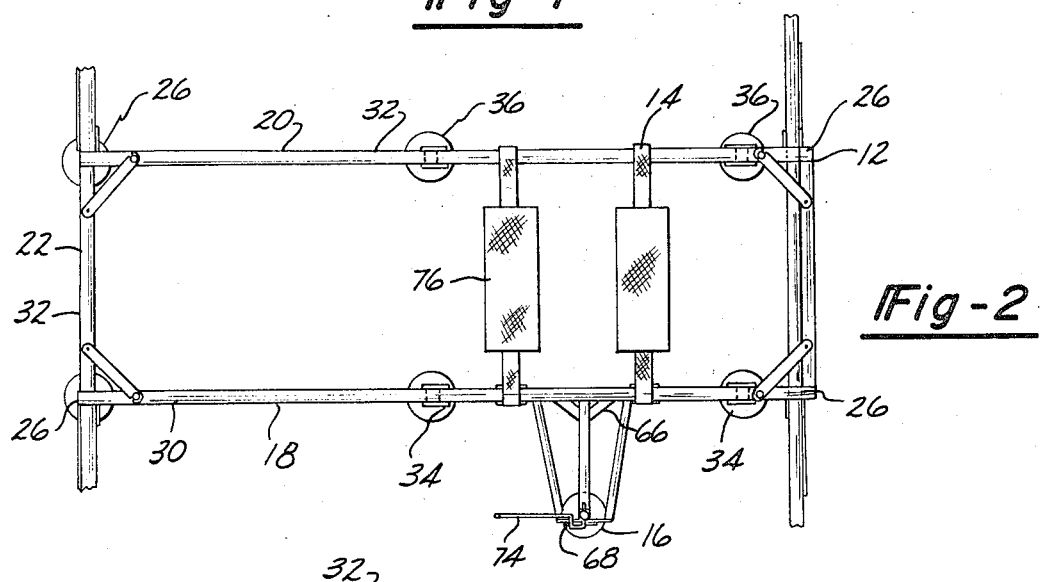
FIG. 2 is a top view of the device of the present invention.

With reference to the drawing and in particular FIGS. 1 and 2, the present invention, generally indicated at 10, includes a frame structure 12, means for supporting the animal when elevated 14, and means for elevating the animal 16.

The frame structure 12 includes a pair of sidewalls 18 and 20, respectively, and crosswall 22. The three walls 18, 20 and 22 define an open-walled frame structure or stall 24 to permit egress of the animal into the confines of the frame structure 12.

Each of the walls include an upstanding corner post 26, a medial horizontal post 28, and a lower horizontal post 30. Extending around the periphery of the frame structure 12 are upper horizontal posts 32. These posts impart rigidity to the frame structure.

Each of the side walls 18 and 20 further include medial upstanding track posts 34 and 36, respectively. The track posts 34 and 36, most rearward of the animal A, function as corner posts, also.

Figure 6:
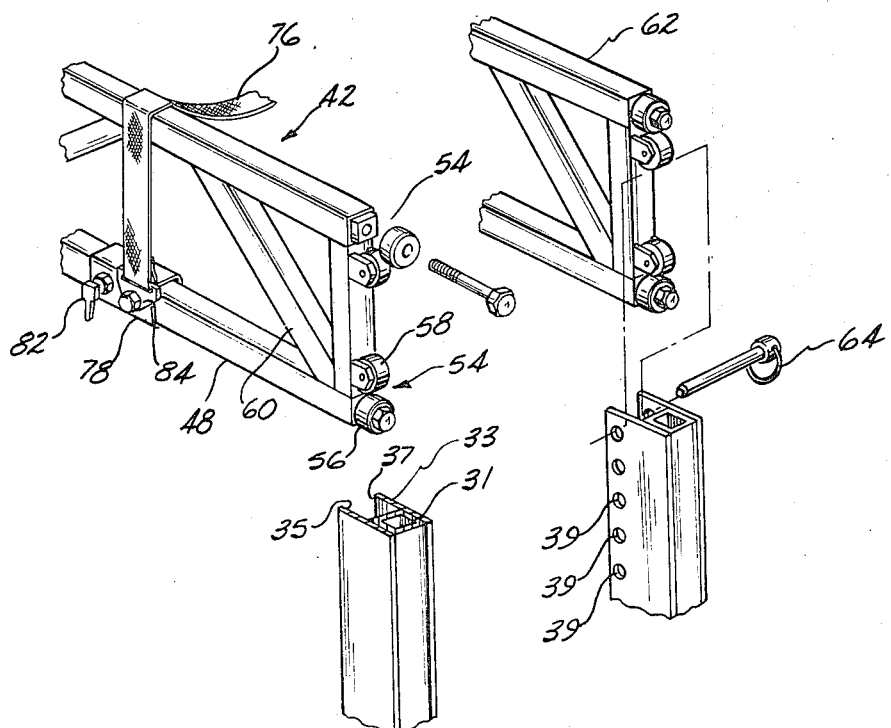
FIG. 6 is an exploded partial perspective view of the carriage and opposite side bar of the device of the present invention.

As shown in FIG. 6, the track post 34 comprises an inner member 31 snugly engaged within an open walled member 33 which is coextensive therewith. The area 35 between the members within the confines of member 33 defines a track 37. The track posts 36 are similarly constructed but have a plurality of registering apertures 39 disposed along the track portion as shown.

Each of the upstanding posts has an adjustable supporting foot 38 disposed at its lower end to impart ground support thereto.

It is contemplated, although not critical to the instant invention and not shown, that each of the upstanding posts comprise a plurality of collapsible telescoping members with means for interlocking said members disposed thereon. This same construction can, also, be accorded the horizontal posts.

A plurality of support structures 40 are further provided on the walls to impart rigidity to the frame structure when in its erect position as shown. These support structures can be integrally formed with, welded or otherwise rigidly interposed with the walls.

Figure 5:
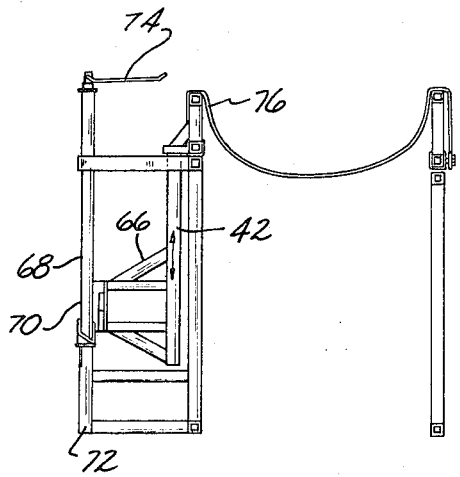
FIG. 5 is a cross-sectional view of the device of the present invention.

Referring now to FIGS. 1, 5 and 6, mounted on the side wall 18 and disposed between the track posts 34 is a vertically displaceable carriage 42. The carriage comprises a rectangular member 44 having parallel spaced-apart upper and lower bars 46, 48 and parallel spaced-apart side bars 50, 52. These bars are integrally formed or welded into the unitary member 44. Each of the side bars 50, 52 have disposed thereon at least one set of rollers 54. The set of rollers 54 comprises first and second rollers 56, 58 having their respective axis of rotation perpendicular to each other to provide a smooth elevation to the carriage to avoid upsetting the animal when it is being elevated.

The carriage 42 may be further provided with support structures or spans 60 as shown.

Figure 3:
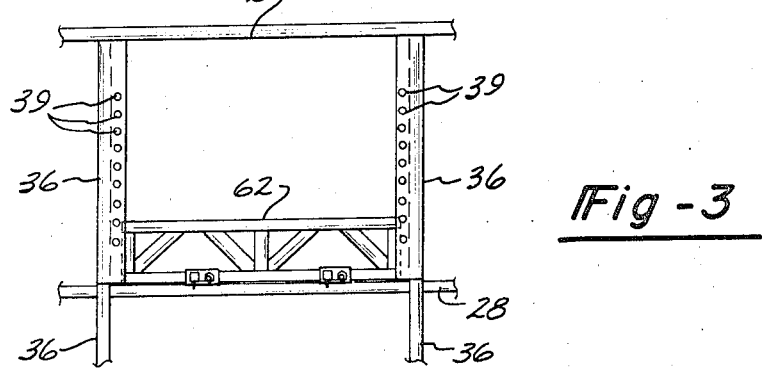
FIG. 3 is a partial side view of the present invention taken from the side opposite FIG. 1.
Figure 4:
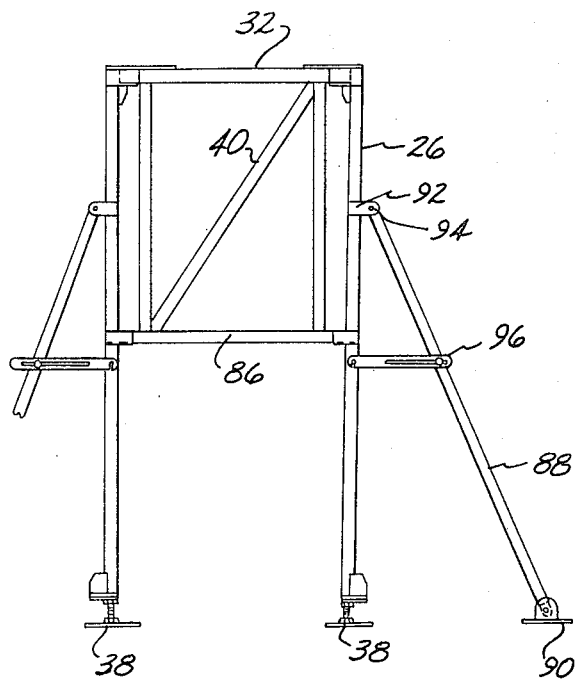
FIG. 4 is an end view of the device of the present invention.

Referring now to FIGS. 2, 3 and 6 mounted on the sidewall 20 and interposed between the track posts 36 is a side bar 62. The side bar 62 is parallel to the carriage 42 and contructed similar thereto. The side bar 62 is vertically displaceable in the track defined by its associated track posts 36. The bar 62 is retained or rendered stationary in position along its respective tracks by means of a retaining pin 64 which extends between any pair of registering apertures 39 disposed therealong and which traverses same.

Referring to FIGS. 1 and 5, interconnecting the carriage 42 to the means for elevating the animal 16 is a webbing 66 which is fixedly secured to the carriage by welding or the like at one end thereof and is likewise secured to the elevating means at its other end. The webbing transfers the motion of the elevating means 16 to the carriage 42.

The means for elevating the animal generally includes a rotatable screw jack 68 disposed within a tubular member 70. The tubular member has one end thereof terminating in a supportive foot 72, interconnected to the post 30, and which imparts stability to the elevating means associated therewith. It is to be noted that the elevating means is laterally displaced from the sidewall so that it is non-interfering to the operator when in use.

The screw jack is operated by means of a rotatable handle 74 which is mounted thereon and interconnected therewith. It is apparent from the preceding that rotation of the handle translates into vertical movement of the carriage thereof by the vertical displacement of the webbing.

As shown in FIGS. 1, 2, 5 and 6, traversing the interior confines of the frame structure 12 is at least one belting 76. The belting 76 is adjustably detachably connected between the carriage 42 and the side bar 62 by means 78. The means 78 includes a conduit 80 slidable on bar 48, and means for locking the conduit 82 provided therewith, such as, a set screw or the like. The belting is threaded through an apertured retainer 84 threadably connected to the conduit 80. The belting is overlapped and sewn together to form a unitary belting, as shown. Preferably, two similar beltings are employed wherein one is disposed proximate the rearward portion of the animal and the other proximate the forward portion.

Thus, when the screw jack is rotated to raise the carriage, the belting engages the underside of the animal to contemporaneously elevate the animal.

It has been found that a great degree of elevation is not required to immobilize the animal. Rather, any degree of elevation sufficient to prevent the legs of the animal from touching a ground surface will achieve immobilization. Since the carriage is only slightly vertically displaced, the downward force vector caused by the weight of the animal is much greater than any horizontal force vector. Therefore, there is no tendency for the elevated animal to slide toward the sidewall 20 due to any inclination of the belting. Thus, although it can be done, it is not required to provide two parallel displaceable carriages.

The device further includes means for inhibiting egress and ingress 86 once the animal is within the stall. Generally, a rod 86 which can be hingedly secured to a side wall and which traverses the open wall will suffice.

Once the animal is immobilized through elevation it can easily be subjected to any desired administered service, such as a veterinary function or the like. Because of the open structure of the device, and the fact that the elevating means is displaced from the structure, per se, there is easy accessibility to the animal to accomplish this.

As shown in the drawing, to further impart stability to the present device a plurality of stanchions 88 are included. The stanchions 88 have a support foot 90 disposed at their ground or terminal ends. The upper ends of the stanchions are connected to the corner posts 26 through apertured brackets 92. A cotter pin 94 extending through the stanchion and bracket rotatably retains the stanchion to the frame structure 12. A slotted bracket 96 connected to the corner post and stanchion is associated with each stanchion. It is apparent that each stanchion can be positioned at any lateral distance from the frame structure to the extent of the slot in backet 96 by providing a locking nut and threaded stud on the stanchion which is insertable through the slot.

It is apparent from the preceding that by using a dual tracked post interposed between the single tracked posts that a plurality of carriages can be mounted on the sidewall. Then, with elevating means associated with each carriage, the rearward and forward parts of the animal can be elevated independently.

Further it is apparent that hydraulic, pneumatic or similar means can be deployed to elevate the carriage. The hydraulic means can comprise any conventional piston and cylinder arrangement with pumping means associated therewith to extend or retract the piston rod. Furthermore, and as apparent to those skilled in the art, through suitable valving arrangements a single hydraulic system can be utilized to operate a plurality of carriages. Useful pneumatic means such as an air jack or the like, can be deployed to elevate the animal in lieu of the hydraulic or mechanical means hereinbefore described.

The present device can further provide cross-ties on the cross wall 22 to restrain the head of the animal.

Having thus described my invention what is claimed is:

1. An elevating device for immobilizing an animal comprising:
   a. an open-walled frame structure having a first side wall, a crosswall and a second side wall, each of the side walls including a pair of spaced apart upstanding track posts, the track posts each having a channel formed therewith,
   b. means for elevating the animal, the means being laterally displaced from the frame structure,
   c. at least one vertically displaceable carriage mounted on the first side wall the carriage comprising a pair of spaced apart side bars and at least one set of rollers mounted on each of the side bars, each set of rollers comprising first and second rollers having their, respective, axes of rotation perpendicular to each other, one of the sets of rollers being disposed in the channel of one of the track posts of the first side wall and the other of the sets of rollers being disposed in the channel of the other track posts of the first side wall and moveable therewithin, the means for elevating the animal being operatively connected to the carriage, and
   d. means for supporting the animal when elevated.

2. The device of claim 1 wherein the second of the side walls carries a side bar interposed between the track posts thereof, the side bar comprising a pair of side posts, each of the side posts having at least one set of rollers mounted thereon, each set of rollers comprising a pair of rollers having their respective axes of rotation perpendicular to each other, one of the sets of rollers being disposed in the channel of one of the track posts and the other of the sets of rollers being disposed in the channel of the other of the track posts, each of the channels associated with the track posts of the second side wall having a plurality of apertures disposed therealong, and including means insertable into the apertures to lock the side bar in position.

3. The device of claim 2 wherein the carriage is mounted parallel to the side bar and the means for supporting the animal extends between the side bar and the carriage.

4. The device of claim 1 wherein the means for elevating the animal comprises a rotatable screw jack.

5. The device of claim 1 wherein the means for supporting the animal comprises at least one belting underlying the animal.

6. The device of claim 5 wherein the means for supporting the animal traverses the interior of the frame structure and is detachably connected at one end thereof to the carriage and to the side bar at its other end.

7. The device of claim 1 which further includes means for inhibiting egress from within the frame structure.

8. The device of claim 1 which further includes a plurality of stabilizing means connected to the frame structure, said means comprising stanchions.

* * * * *